(12) United States Patent
Taraszkiewicz et al.

(10) Patent No.: US 9,631,355 B1
(45) Date of Patent: Apr. 25, 2017

(54) SEPTIC DRAINAGE SYSTEM

(71) Applicants: Stanley Taraszkiewicz, Southgate, MI (US); Robert Taraszkiewicz, Southgate, MI (US)

(72) Inventors: Stanley Taraszkiewicz, Southgate, MI (US); Robert Taraszkiewicz, Southgate, MI (US)

( * ) Notice: Subject to any disclaimer, the term of this patent is extended or adjusted under 35 U.S.C. 154(b) by 0 days.

(21) Appl. No.: 15/152,537

(22) Filed: May 11, 2016

(51) Int. Cl.
*B60R 11/00* (2006.01)
*E03F 1/00* (2006.01)
*F16L 3/26* (2006.01)
*B60R 15/00* (2006.01)

(52) U.S. Cl.
CPC .............. *E03F 1/008* (2013.01); *B60R 15/00* (2013.01); *F16L 3/26* (2013.01)

(58) Field of Classification Search
CPC ... B05B 15/062; B05B 15/061; B05B 15/063; B05B 15/00; B05B 15/10; B05B 1/202; B05B 13/0257; B05B 15/001; B05B 15/06; B05B 15/064; B05B 15/065; B05B 15/068; B05B 1/20; B05B 3/0472; B05B 3/063; E03F 1/008; E03F 11/00; E03F 1/00; E03F 7/106; E03F 9/00; E03F 1/002; E03F 3/02; E03F 3/046; E03F 5/105; E03F 5/22; E03F 7/00; E03F 7/10; F16L 3/26; F16L 3/003; F16L 3/00; F16L 3/24
USPC ................... 248/75, 80, 83, 85, 87
See application file for complete search history.

(56) References Cited

U.S. PATENT DOCUMENTS

| 3,021,102 | A |   | 2/1962  | Kuempel    |                     |
|-----------|---|---|---------|------------|---------------------|
| 3,572,622 | A | * | 3/1971  | Smith      | F16L 3/00 182/181.1 |
| 3,809,348 | A |   | 5/1974  | Di Laura   |                     |
| 3,819,137 | A |   | 6/1974  | Smith      |                     |
| 4,403,758 | A |   | 9/1983  | Burt       |                     |
| 4,406,434 | A |   | 9/1983  | Schneckloth|                     |
| 4,712,755 | A | * | 12/1987 | Robbins    | E03F 1/008 138/106  |
| 4,715,570 | A | * | 12/1987 | Mashuda    | F16L 3/26 138/106   |
| 5,033,702 | A | * | 7/1991  | Robbins    | F16L 3/26 248/80    |
| 5,431,455 | A | * | 7/1995  | Seely      | E03F 1/008 248/49   |
| 5,785,457 | A | * | 7/1998  | Thompson   | F16L 1/201 248/72   |
| 5,788,193 | A |   | 8/1998  | Hilbert    |                     |
| 6,332,595 | B1| * | 12/2001 | Klucznik   | F16L 1/0246 248/80  |

(Continued)

FOREIGN PATENT DOCUMENTS

WO    WO2011074161    6/2011

*Primary Examiner* — Steven Marsh

(57) ABSTRACT

A septic drainage system includes a vehicle that has a septic tank and the septic tank has an outlet. A hose is selectively fluidly coupled to the outlet. Thus, the hose may drain the septic tank. The hose has a distal end with respect to the outlet. The distal end may be fluidly coupled to an inlet of a sewer thereby facilitating the septic tank to drain into the sewer. A supporting unit is provided and the supporting unit may be positioned on a support surface. The hose is positioned on the supporting unit such that the hose is inhibited from becoming uncoupled from the outlet and the sewer. Thus, the supporting unit enhances draining the septic tank.

6 Claims, 3 Drawing Sheets

(56) References Cited

U.S. PATENT DOCUMENTS 7,926,768 B2     4/2011   Prest
D736,601 S       8/2015   Cox et al.
9,211,847 B1 * 12/2015   Cox ........................ E03F 1/008

* cited by examiner

SEPTIC DRAINAGE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

(2) Description of Related Art Including Information Disclosed Under 37 CFR 1.97 and 1.98.

The disclosure and prior art relates to drainage devices and more particularly pertains to a new drainage device for draining an RV septic tank into a sewer.

BRIEF SUMMARY OF THE INVENTION

An embodiment of the disclosure meets the needs presented above by generally comprising a vehicle that has a septic tank and the septic tank has an outlet. A hose is selectively fluidly coupled to the outlet. Thus, the hose may drain the septic tank. The hose has a distal end with respect to the outlet. The distal end may be fluidly coupled to an inlet of a sewer thereby facilitating the septic tank to drain into the sewer. A supporting unit is provided and the supporting unit may be positioned on a support surface. The hose is positioned on the supporting unit such that the hose is inhibited from becoming uncoupled from the outlet and the sewer. Thus, the supporting unit enhances draining the septic tank.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
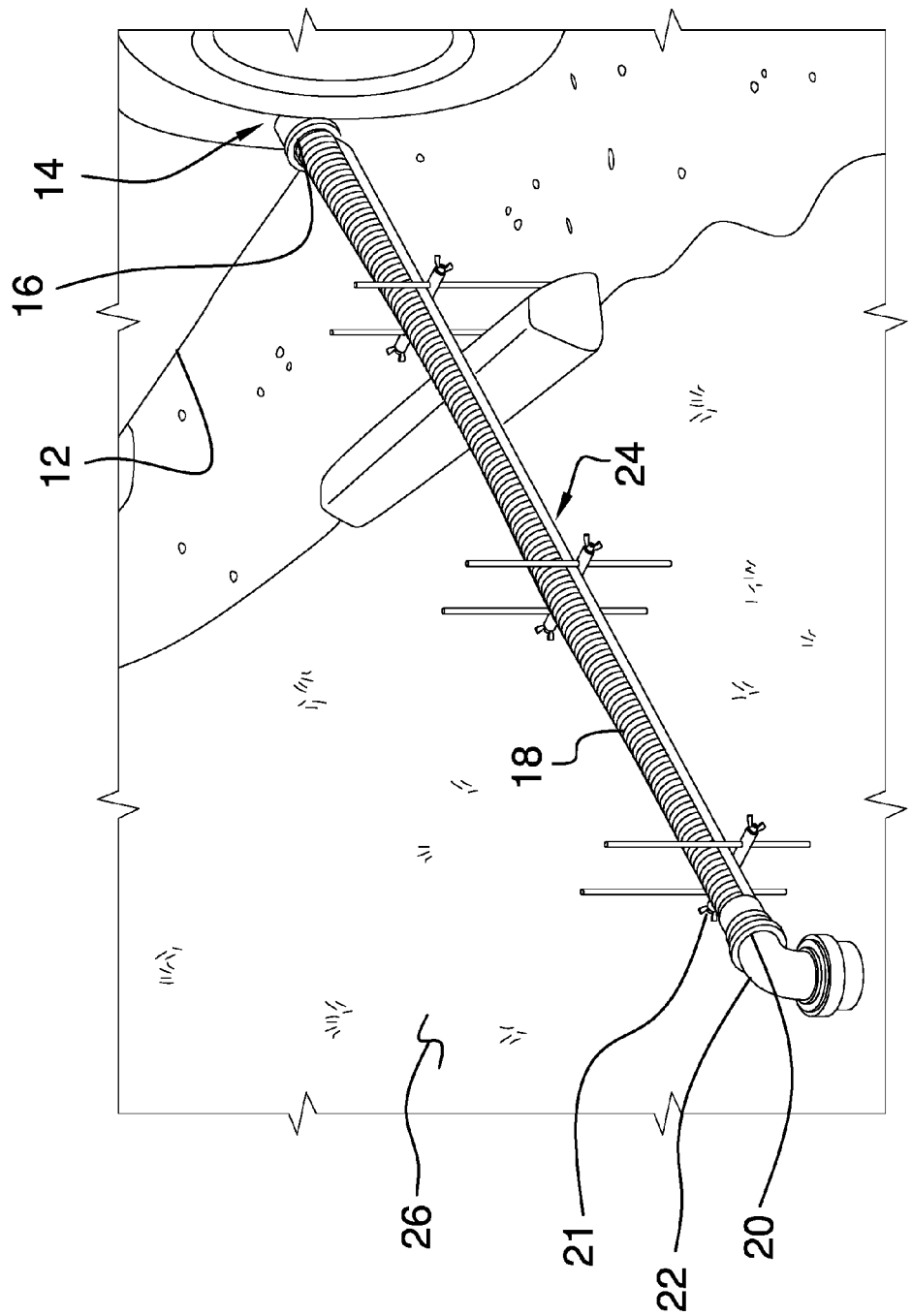
FIG. 1 is a perspective in-use view of a septic drainage system according to an embodiment of the disclosure.
Figure 2:
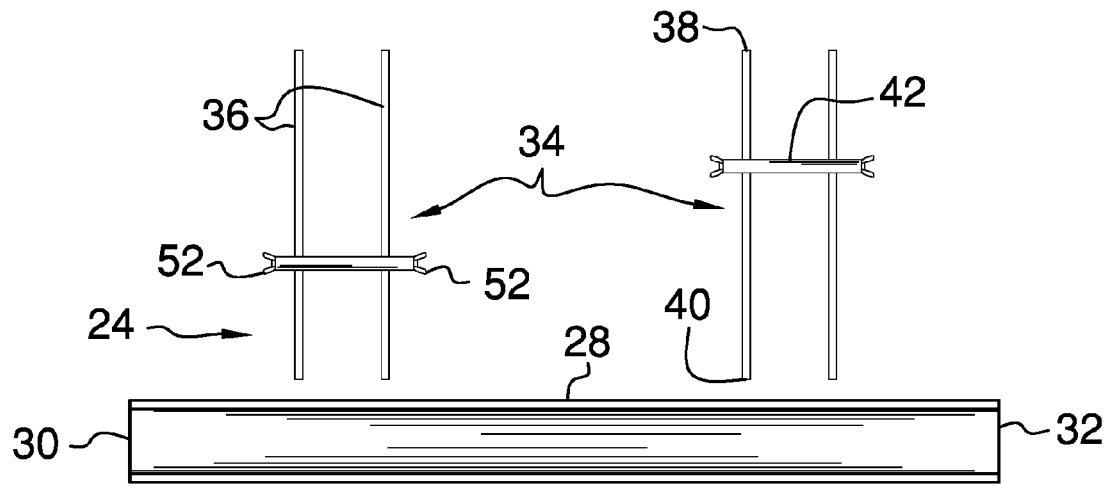
FIG. 2 is a perspective view of an embodiment of the disclosure.
Figure 3:
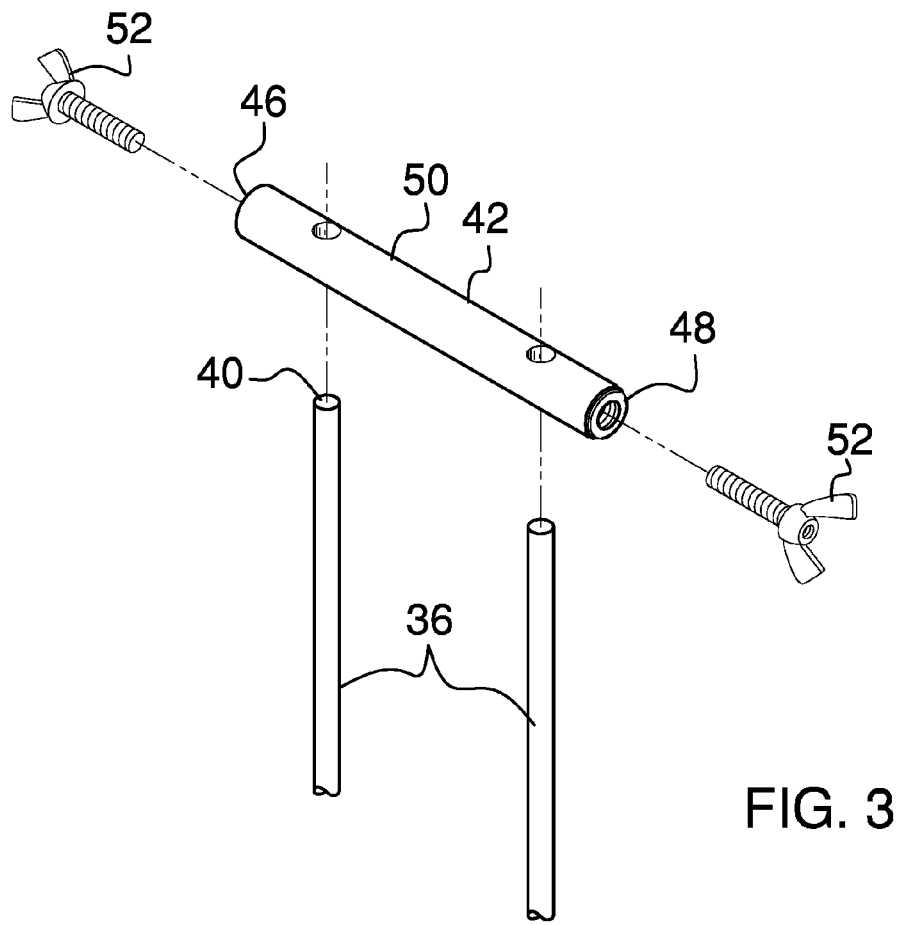
FIG. 3 is a top perspective view of stand of an embodiment of the disclosure.
Figure 4:
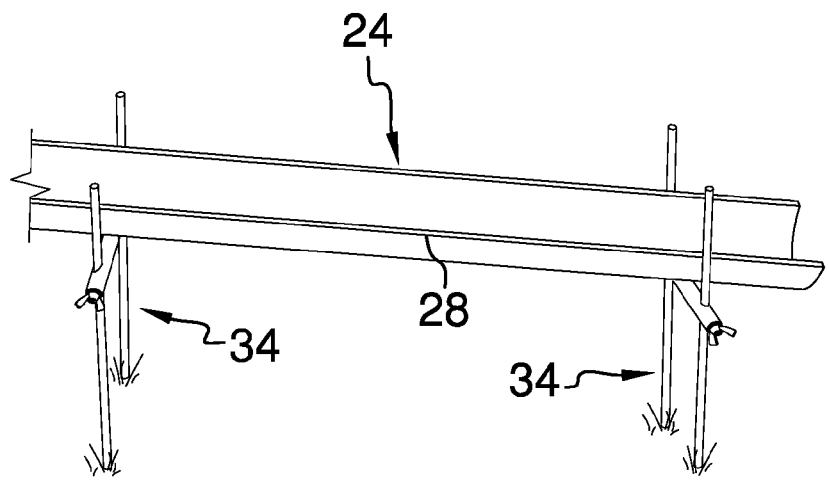
FIG. 4 is a side perspective view of an embodiment of the disclosure.
Figure 5:
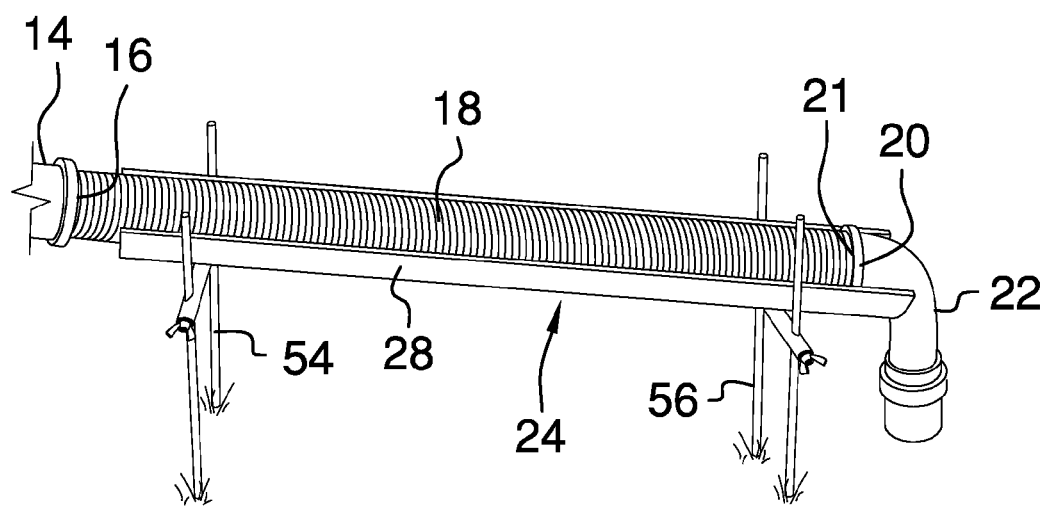
FIG. 5 is a side perspective in-use view of an embodiment of the disclosure.

With reference now to the drawings, and in particular to FIGS. 1 through 5 thereof, a new drainage device embodying the principles and concepts of an embodiment of the disclosure and generally designated by the reference numeral 10 will be described.

As best illustrated in FIGS. 1 through 5, the septic drainage system 10 generally comprises a vehicle 12 that has a septic tank 14. The septic tank 14 has an outlet 16. The vehicle 12 may be an RV or the like. The septic tank 14 may contain fluid and solid human waste.

A hose 18 is selectively fluidly coupled to the outlet 16. The hose 18 has a distal end 20 with respect to the outlet 16. The distal end 20 may be fluidly coupled to an inlet 21 of a sewer 22 thereby facilitating the septic tank 14 to drain into the sewer 22. The sewer 22 may be a public sewer in a camp ground or the like. The hose 18 may be an RV sewer hose or the like.

A supporting unit 24 is provided and the supporting unit 24 may be positioned on a support surface 26. The hose 18 is positioned on the supporting unit 24 such that the hose 18 is inhibited from becoming uncoupled from the outlet 16 and the sewer 22. Thus, the supporting unit 24 enhances draining the septic tank 14. The support surface 26 may be ground.

The supporting unit 24 comprises a trough 28. The hose 18 is selectively positioned in the trough 28. The trough 28 has a first end 30 and a second end 32. The trough 28 is elongated between the first end 30 and the second end 32.

A plurality of stands 34 is provided. Each of the stands 34 may be manipulated to penetrate the support surface 26. Moreover, the stands 34 are positioned to be aligned with each other. The trough 28 is positioned on the stands 34. Thus, the trough 28 retains the hose 18 in a stationary position. Moreover, the trough 28 inhibits the hose 18 from becoming uncoupled from the outlet 16.

Each of the stands 34 comprises a pair of uprights 36. Each of the uprights 36 has a first end 38 and a second end 40. The first end 38 of each of the uprights 36 may penetrate the support surface 26 having the uprights 36 being spaced apart from each other. Each of the uprights 36 may have a length ranging between fifteen cm and thirty cm.

A sleeve 42 is provided that has a primary end 46, a secondary end 48 and an outer wall 50 extending therebetween. The second end 40 corresponding to each of the uprights 36 is extended through the outer wall 50 of the sleeve 42. The sleeve 42 is oriented perpendicular to the uprights 36 and the trough 28 is positioned on the sleeve 42. Thus, the sleeve 42 supports the trough 28 above the support surface 26.

A pair of screws 52 is provided. Each of the screws 52 threadably engages an associated one of the primary end 46 and the secondary end 48 of the sleeve 42. Each of the screws 52 is selectively tightened to frictionally engage an associated one of the uprights 36. Thus, the pair of screws 52 retains the sleeve 42 a selected distance from the support surface 26. The plurality of stands 34 may include a first stand 54 and a second stand 56.

In use, the first stand 54 is positioned adjacent to the outlet 16 on the septic tank 14. The second stand 56 is positioned adjacent to the inlet 21 of the sewer 22. The sleeve 42 corresponding to the first stand 54 is positioned at a height from the support surface 26 that is greater than a height between the support surface 26 and the sleeve 42 corresponding to the second stand 56. The trough 28 is positioned on the sleeve 42 corresponding to each of the stands 34. Thus, the trough 28 slopes downhill between the septic tank 14 and the sewer 22. The hose 18 is fluidly coupled between the septic tank 14 and the sewer 22 and the hose 18 is positioned on the trough 28. Thus, the hose 18 is retained at a downward slope between the septic tank 14 and the sewer 22. The hose 18 is removed from the septic tank 14 and the sewer 22 when the septic tank 14 is drained.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A septic drainage system comprising:
   a vehicle having a septic tank, said septic tank having an outlet;
   a hose being selectively fluidly coupled to said outlet wherein said hose is configured to drain the septic tank, said hose having a distal end with respect to said outlet, said distal end being configured to be fluidly coupled to an inlet of a sewer thereby facilitating said septic tank to drain into the sewer;
   a supporting unit being configured to be positioned on a support surface, said hose being positioned on said supporting unit such that said hose is inhibited from becoming uncoupled from said outlet and the sewer wherein said supporting unit is configured to enhance draining said septic tank;
   a plurality of stands, each of said stands being configured to penetrate the support surface having said stands being aligned with each other, said supporting unit being positioned on said stands such that said supporting unit inhibits said hose from becoming uncoupled from said outlet, each of said stands comprising a pair of uprights and a sleeve, said uprights of each said stand extending through said sleeve of said stand, said trough being positionable on each said sleeve wherein said stands are configured to support said trough above the support surface; and
   a plurality of screws, each of said screws threadably engaging an associated one of said sleeves such that said screw frictionally engages an associated one of said uprights wherein said associated sleeve is secured in a static position relative to said associated upright, each of said screws extending laterally away from said supporting unit wherein said screw is accessible for adjustment of a position of said associated sleeve relative to said associated upright.

2. The system according to claim 1, wherein said supporting unit comprises a trough having said hose being positioned therein, said trough having a first end and a second, said trough being elongated between said first end and said second end.

3. The system according to claim 1, further comprising each of said uprights having a first end and a second end, said first end of each of said uprights being configured to penetrate the support surface having said uprights being spaced apart from each other.

4. The system according to claim 3, further comprising said sleeve having a primary end, a secondary end and an outer wall extending therebetween, said second end corresponding to each of said uprights being extended through said sleeve such that said sleeve is oriented perpendicular to said uprights.

5. The system according to claim 4, further comprising each of said screws threadably engaging an associated one of said primary end and said secondary end of said associated sleeve.

6. A septic drainage system comprising:
   a vehicle having a septic tank, said septic tank having an outlet;
   a hose being selectively fluidly coupled to said outlet wherein said hose is configured to drain the septic tank, said hose having a distal end with respect to said outlet, said distal end being configured to be fluidly coupled to an inlet of a sewer thereby facilitating said septic tank to drain into the sewer;
   a supporting unit being configured to be positioned on a support surface, said hose being positioned on said supporting unit such that said hose is inhibited from becoming uncoupled from said outlet and the sewer wherein said supporting unit is configured to enhance draining said septic tank, said supporting unit comprising a trough having said hose being positioned therein, said trough having a first end and a second, said trough being elongated between said first end and said second end;
   a plurality of stands, each of said stands being configured to penetrate the support surface having said stands being aligned with each other, said supporting unit being positioned on said stands such that said supporting unit inhibits said hose from becoming uncoupled from said outlet, each of said stands comprising a pair of uprights and a sleeve, said uprights of each said stand extending through said sleeve of said stand, said trough being positionable on each said sleeve wherein said stands are configured to support said trough above the support surface, each said sleeve having a primary end, a secondary end and an outer wall extending therebetween, said second end corresponding to each of said uprights being extended through said sleeve such that said sleeve is oriented perpendicular to said uprights, each of said uprights having a first end and a second end, said first end of each of said uprights being configured to penetrate the support surface having said uprights being spaced apart from each other; and a plurality of screws, each of said screws threadably engaging an associated one of said sleeves such that said screw frictionally engages an associated one of said uprights wherein said associated sleeve is secured in a static position relative to said associated upright, each of said screws extending laterally away from said supporting unit wherein said screw is accessible for adjustment of a position of said associated sleeve relative to said associated upright, each of said screws threadably engaging an associated one of said primary end and said secondary end of said associated sleeve.

* * * * *